May 21, 1963

L. E. SHUMAKER 3,090,141

LAND LEVELING ATTACHMENT FOR TRACTORS

Filed May 12, 1961

INVENTOR.
LAWRENCE E. SHUMAKER
BY

ATTORNEY

INVENTOR.
LAWRENCE E. SHUMAKER
BY
ATTORNEY

May 21, 1963 L. E. SHUMAKER 3,090,141
LAND LEVELING ATTACHMENT FOR TRACTORS
Filed May 12, 1961 3 Sheets-Sheet 3
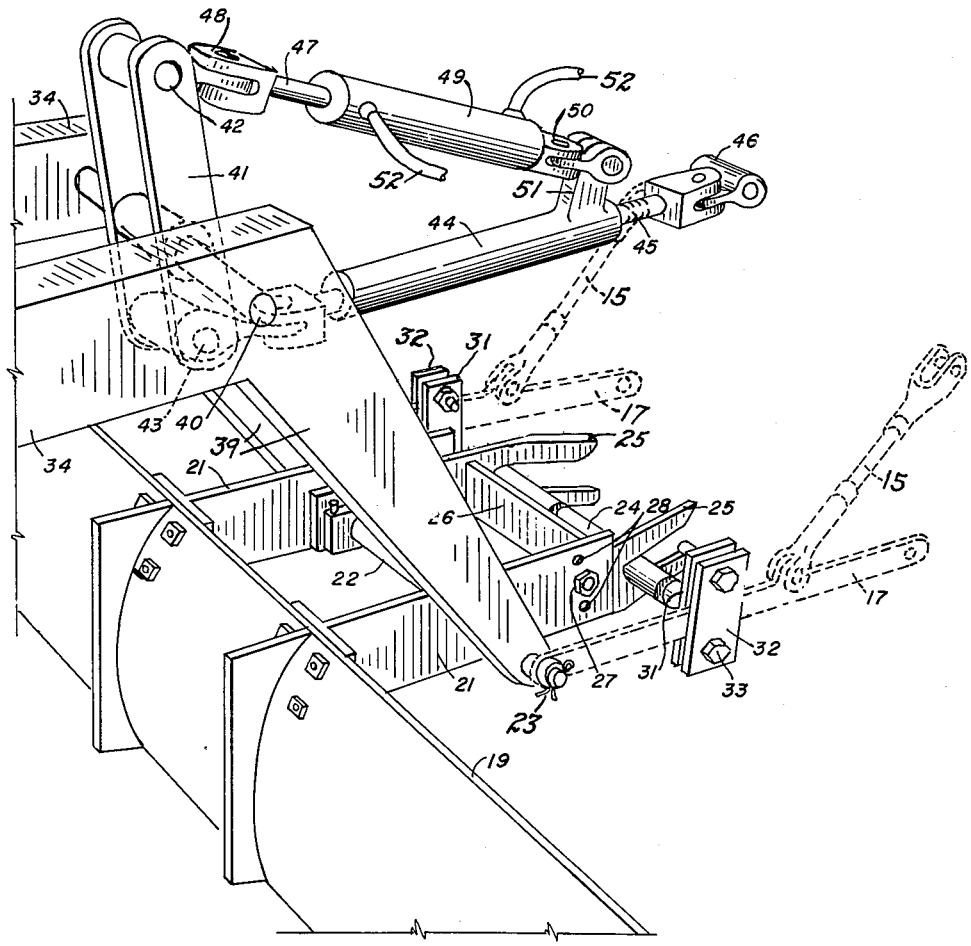
FIG. 5
FIG. 6
INVENTOR.
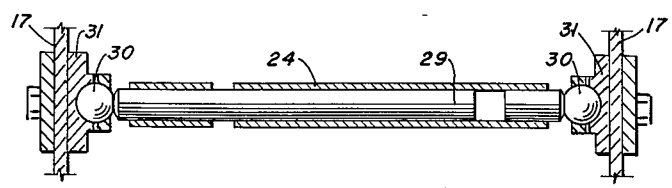
ATTORNEY United States Patent Office 3,090,141
Patented May 21, 1963

3,090,141
LAND LEVELING ATTACHMENT FOR TRACTORS
Lawrence E. Shumaker, Denver, Colo., assignor to The Eversman Mfg. Company, Denver, Colo., a corporation of Colorado
Filed May 12, 1961, Ser. No. 119,764
8 Claims. (Cl. 37—180)

This invention relates to a land leveling attachment for tractors of the type having hydraulically-actuated implement linkage and has for its principal object the provision of a land leveling implement which will be adaptable for attachment to any of the various makes and models of tractors and which can be quickly and easily attached to the tractor by simply backing the latter to the implement so as to provide a simple, rapid, one-man attachment and detachment without the use of tools or other equipment.

Another object is to provide a highly efficient tractor mounted land leveling blade which will automatically travel in a uniform plane as the tractor moves forwardly over surface undulations so as to cut-away high areas and fill in low areas to produce a uniformly flat ground surface.

A further object is to provide means for attaching a land leveling blade to a tractor which will enable all positions of the blade to be preset and fully controlled by the conventional hydraulic system of the tractor and to so construct the mounting that the blade will be slightly depressed at its pivoted extremity when the tractor is turned around at the ends of the runs so as to relieve the load on the rapidly moving outer extremity of the blade and provide a pivot drag at the inner extremity to facilitate turning.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 5 is a perspective view of the front portion of the leveling attachment; and FIG. 6 is a front view, partly in section, of the fulcrum member and its attachment to the draft arms of the tractor.

Figures 1, 2:
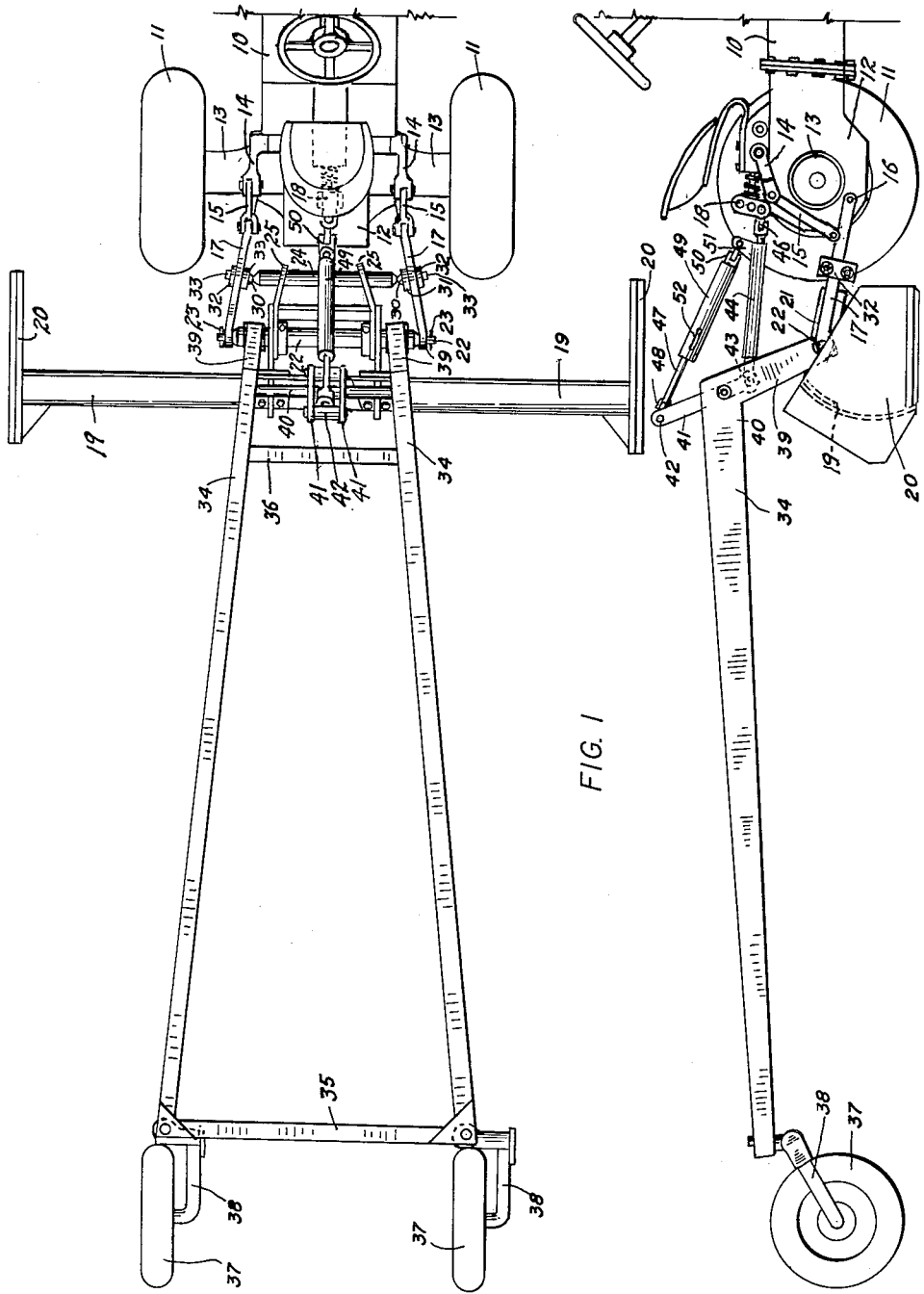
FIG. 1 is a top plan view illustrating the improved land leveling attachment mounted at the rear of a conventional tractor.
FIG. 2 is a right side view thereof.
Figure 3:
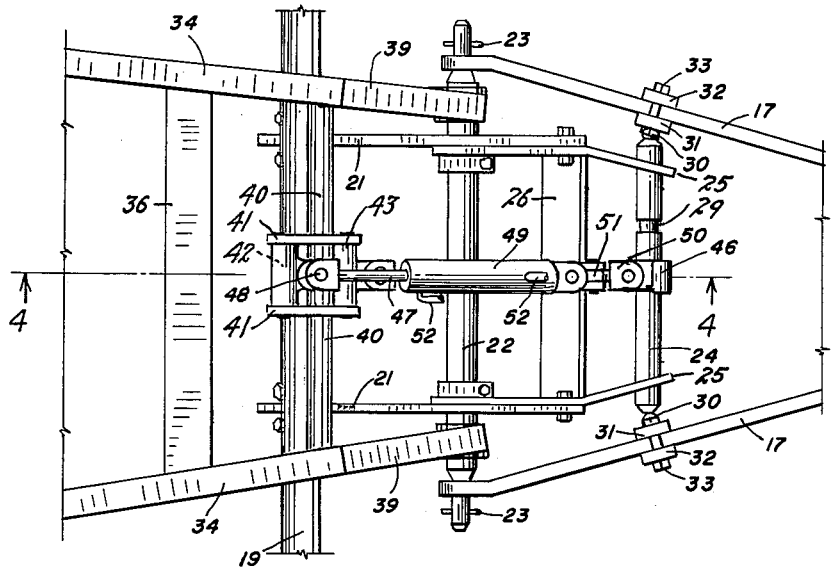
FIG. 3 is an enlarged fragmentary top view of the forward portion of the leveling attachment.
Figure 4:
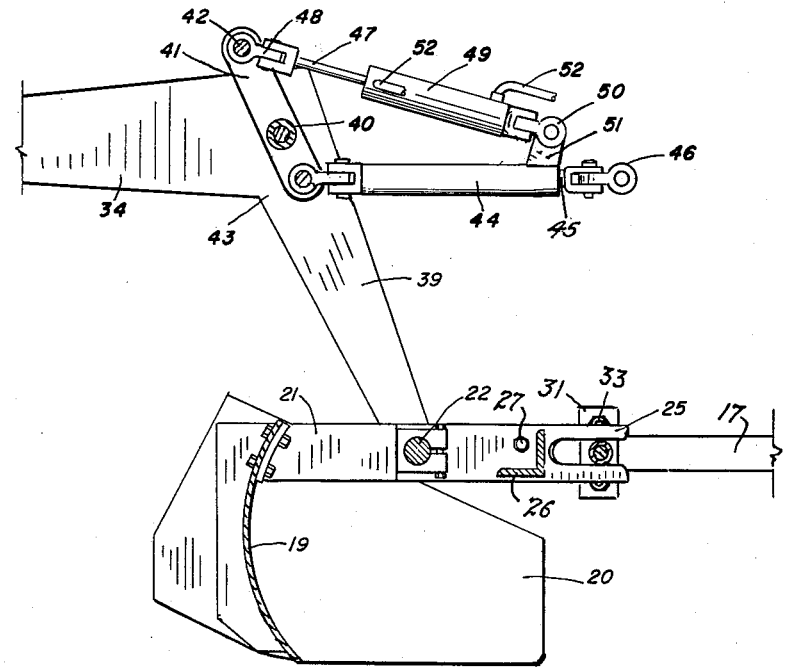
FIG. 4 is a longitudinal section through the portion of FIG. 2 taken on the line 4—4, FIG. 3.

In FIGS. 1 and 2 only sufficient elements of a conventional tractor have been illustrated to show the manner of mounting the improved land leveling attachment thereon. These elements are designated by numeral as follows: tractor chassis 10, rear drive wheels 11, differential gear housing 12, rear axle housing 13, hydraulic implement lift arms 14, implement lift links 15, lower implement attachment studs 16, draft arms 17 and upper hydraulic control yoke 18.

For general implement use, the draft arms 17 are connected to a draw bar to which a plow or other implement is attached and an upper link member extends from the implement to the hydraulic control yoke 18. Should the implement encounter an obstruction sufficient to elevate the front of the tractor, the upper hydraulic control yoke will actuate the hydraulic mechanism to swing the lift arms upwardly to lift the implement and relieve the load. This invention is designed for attachment to the draft arms 17 and to the upper hydraulic control yoke 18.

The improved land leveling attachment employs a horizonal, transversally-extending, arcuate leveling blade 19 preferably provided with end plates 20. Two tongue members 21 are bolted or otherwise secured to the blade 19 adjacent its upper edge and intermediate its extremities and extend forwardly therefrom in parallel relation.

A hinge shaft 22 extends through the tongue members 21 and projects oppositely outward therefrom to enter receiving openings in the rear extremities of the two draft arms 17. The draft arms 17 may be retained on the extremities of the hinge shaft 22 in any desired manner such as by means of withdrawable keys 23.

It is necessary that the blade move upwardly and downwardly with the hydraulically actuated movements of the draft arms 17. This is accomplished by placing a fulcrum member 24 between the draft arms to be engaged by forked members 25, there being one of the members 25 on the forward extremity of each of the tongue members.

The tongue members are maintained in spaced and aligned relation by means of a spacing angle 26, rigidly secured therebetween, and extend rearwardly to a pivotal mounting about the hinge shaft 22. The forked members 25 are secured to the tongue members 21 forwardly of the hinge shaft 22 by means of attachment bolts 27. The vertical angular position of the forked members can be adjusted by varying the position of the bolts 27 in a series of bolt holes 28 in the tongue members 21.

The fulcrum member 24 is constructed in any desired manner so as to be extensible as to length. As illustrated, the member is tubular so as to receive an extension shaft 29. The member 24 and the extension shaft 29 each terminates in a ball 30 to be received in suitable ball sockets on inner clamping plates 31. Each inner clamping plate is clamped against one of the draft arms 17 through the medium of an outer clamping plate 32 and suitable clamping bolts 33. The fulcrum member, after once installed on the draft arms, remains permanently in place while the tractor is used for any desired purpose.

The automatic leveling is accomplished through the medium of a rearwardly-extending leveler frame consisting of two side frame members 34 maintained in rearwardly-flaring relation by means of a rear cross frame member 35 and front cross frame member 36. The rear extremity of the leveler frame is supported upon two caster wheels 37 journalled upon castor brackets 38 mounted to rotate horizontally realtive to the leveler frame so as to follow the movements of the latter.

The forward extremities of the two side frame members 34 turn downwardly and forwardly as shown at 39 to a pivotal mounting on the extremities of the hinge shaft 22 between the tongue members 21 and the draft arms 17.

A rocker shaft 40 extends horizontally between the forward extremities of the side frame memberrs 34 at their junction with the downwardly turned extremities 39 to support a rotatable rocking member 41 therebetween. The rocking member 41 is provided with an upper crank pin 42 and a lower crank pin 43, the distance from the rocker shaft 40 to the upper pin 42 being substantially twice the distance between the axis pin and the lower crank pin 43.

A longitudinally adjustable compression member 44 consisting of an outer internally threaded tube with a jackscrew 45 threaded therein is hingedly mounted on the lower crank pin 43 and extends forwardly therefrom terminating in a suitable universal hinged coupling 46 for attachment to the hydraulic control yoke 18 of the tractor.

The rearward extremity of a hydraulic plunger 47 is attached to the upper crank pin 42 by means of a suitable hinged coupling 48 which allows universal hinged movement. The plunger 47 extends into the rear extremity of a hydraulic cylinder 49, the forward extremity of which is universally hinged as shown at 50 to an upstanding ear 51 on the forward extremity of the compression member 44. The hydraulic cylinder 49 is, of course, provided with suitable hydraulic hoses 52 leading to control valves and a source of hydraulic pressure as is conventional in hydraulic cylinder operation. It can be seen that operation of the hydraulic cylinder and its plunger acts to change the effective length of the compression member.

To install the leveling attachment on the tractor, it is only necessary to back the tractor so that the fulcrum member 24 will enter the forked members 25. The two rear extremities of the two draft arms are now pulled apart and the backing is continued until the draft arms can be slipped over the extremities of the hinge shaft. The key pins are now slipped in place to retain the draft arms in position. The upper hinged coupling 46 is slipped into the hydraulic control yoke of the tractor and the retaining pin with which all such yokes are provided is slipped into place to lock the compression member 44 in place. The hoses 51 are now connected and the attachment is ready for use. It can be released by simply withdrawing the key and yoke pins and disconnecting the hydraulic hoses.

The compression member 44, and its jackscrew 45, and the bolts 27 are adjusted in the holes 28 for the particular tractor upon which the attachment is to be used. These adjustments are to align the lower edge of the blade with the horizontal plane of the tractor and castor wheels. The adjustments need not be made again as long as the attachment is to be used upon the same or a similar tractor.

Let us assume the attachment has been properly attached and adjusted and that the tractor is driven forwardly over uneven ground and that a hump or high area is encountered. As the front tractor wheels pass over the hump, the rear tilt of the tractor will cause the compression member 44 to force the shaft 40 rearwardly and upwardly so that the lower edge of the blade will remain in the plane of the front wheels of the tractor and the castor wheels in spite of the rearward and downward tilt of the tractor. When the rear tractor wheels 11 rise over the hump, the compression member 44 pull the shaft 40 forwardly to lower the blade relative to the rear wheels of the tractor so as to maintain the lower edge of the blade in the original preset uniform plane.

Should it be desired to force the blade downwardly, or to lift the castor wheels using the blade as a fulcrum, hydraulic fluid is admitted to the rear of the cylinder 49 to retract the plunger 47 and shorten the effective length of the compression member. Should it be desired to elevate the blade for transportation, hydraulic fluid is admitted to the forward extremity of the cylinder 49 to increase the effective length of the compression member 44 to force the pivot shaft 40 rearwardly to place the blade weight on the castor wheels.

If the blade were rigidly connected to the draft arms 17, it would be extremely difficult to initiate a sharp turn to the right or left, due to the inertia of the leveling frame and the engagement of the blade with the earth. The slidable relation, however, between the forked member 25 and the fulcrum member 24 provides a floating action allowing the tractor to start the turn while the leveling attachment follows around the turn. It will be noted that when the forked members move sidewardly along the fulcrum member during a turn, they swing the lift links to the side causing the blade to lift up slightly at the outer radius of the turn and downwardly at the inner radius thereof so as to relieve the load on the inner extremity to facilitate the turn. In other words, the blade is suspended in a floating position on the plane of the front tractor wheels and the trailing castor wheels.

If it is desired to use the blade for simple scraping or earth moving purposes, the leveling frame need not be attached. The elevation of the blade can then be manually controlled through the conventional hydraulic system of the tractor to swing the lift arms 14 upwardly and downwardly thereby raising and lowering the blade through the medium of the lift links 15.

While a specific form of the improvement has been described and illustrated herein, it is to be understood that the same may be varied within the scope of the appended claims, without departing from the spirit of the invention.

Having thus described the invention, what is claimed and desired to be secured by Letters Patent is:

1. An earth moving implement for a tractor comprising: a pair of draft arms; means for securing said draft arms to said tractor in vertically-movable, rearwardly-extending, spaced-apart relation; a scraper blade; a pair of tongue members fixedly mounted on and extending forwardly from said scraper blade; a substantially-straight, elongated hinge shaft mounted on and extending transversally between said tongue members substantially parallel to said blade with its extremities projecting oppositely outward from said tongue members; said draft arms being removably connected to the extremities of said hinge shaft; an elongated fulcrum member; means attaching the extremities of said fulcrum member to said draft arms so that it will extend horizontally therebetween parallel to and forwardly of said hinge shaft, the forward extremities of said tongue members engaging said fulcrum member so that said blade will move vertically in consequence of the vertical movements of said draft arms; a leveling frame having wheels at the rear end thereof, the forward extremity of said frame being hingedly supported on said hinge shaft; and a compression member adapted to be interconnected between said tractor and the forward extremity of said leveling frame to transmit vertical angular movements of said tractor to said frame.

2. An earth moving implement as described in claim 1 having means for pivotally attaching the extremities of said fulcrum member to said draft arms so as to allow relative angular movement between said member and said arms.

3. An earth moving implement as described in claim 2 in which said fulcrum member is telescopically extendable to allow said draft arms to be separated for attachment over the extremities of said hinge shaft.

4. An earth moving implement as described in claim 1 having a bifurcated forked member mounted on the forward extremities of each of said tongue members, the furcations of which slidably engage said fulcrum member to prevent rotation of said tongues about the axis of said hinge shaft.

5. An earth moving implement as described in claim 3 having removable retaining means for removably retaining said draft arms in place on the extremities of said hinge shaft.

6. An earth moving implement as defined in claim 1 wherein said leveling frame has castor wheels supporting the rear extremity of said frame, said downwardly turned portion being hingedly mounted on said hinge shaft to support the forward extremity of said frame.

7. A land leveling attachment as described in claim 1 having a hydraulically-actuated device operatively connected with and acting to vary the effective length of said compression member.

8. A land leveling attachment as described in claim 6 in which the hydraulically-actuated device comprises: a rocker shaft mounted in said forward extremity; a rocking member mounted on said rocker shaft so as to rotate in a medial vertical plane relative to said leveling frame; means pivotally connecting said compression member to said rocking member at one side of said rocker shaft; and an extendable member extending from a pivotal mounting on said compression member rearwardly to a pivotal connection with said rocking member on the other side of said rocker shaft so that variations in length of said extendable member will rock said rocking member to vary the effective length of said compression member.

References Cited in the file of this patent

UNITED STATES PATENTS

| | | |
|---|---|---|
| 2,346,757 | Horner | Apr. 18, 1944 |
| 2,463,169 | Grewe | Mar. 1, 1949 |
| 2,710,467 | Cundiff | June 14, 1955 |
| 2,795,060 | Geiszler | June 11, 1957 |
| 2,994,977 | Shumaker et al. | Aug. 8, 1961 |

FOREIGN PATENTS

| | | |
|---|---|---|
| 1,003,978 | Germany | Mar. 7, 1957 |